United States Patent [19]

Fork et al.

[11] Patent Number: 5,547,337

[45] Date of Patent: Aug. 20, 1996

[54] METHOD AND CLOSED-LOOP CONTROL DEVICE FOR THE CLOSED-LOOP CONTROL OF A TURBINE-GENERATOR CONFIGURATION

[75] Inventors: Kurt Fork, Neunkirchen; Frank Krutemeier, Hemhofen, both of Germany

[73] Assignee: Siemens Aktiengesellschaft, Munich, Germany

[21] Appl. No.: 345,136

[22] Filed: Nov. 28, 1994

Related U.S. Application Data

[63] Continuation of PCT/DE93/00391, May 5, 1993.

[30] Foreign Application Priority Data

May 27, 1992 [DE] Germany .......................... 42 17 625.5

[51] Int. Cl.[6] .................................................... F04D 17/06
[52] U.S. Cl. .................................................... 415/1; 415/17
[58] Field of Search ................................... 415/1, 13, 15, 415/16, 17, 26, 29, 39

[56] References Cited

U.S. PATENT DOCUMENTS

| | | | |
|---|---|---|---|
| 4,118,935 | 10/1978 | Andersson | 415/39 |
| 4,368,520 | 1/1983 | Hwang et al. | 415/17 |
| 4,603,394 | 7/1986 | Bukowdki et al. | 415/17 |
| 4,695,221 | 9/1987 | Swearingen | 415/17 |
| 4,798,513 | 1/1989 | Tone | 415/17 |
| 5,170,629 | 12/1992 | Sindeler | 415/26 |

FOREIGN PATENT DOCUMENTS

| | | |
|---|---|---|
| 2447632 | 4/1976 | Germany . |
| 2851871 | 6/1984 | Germany . |
| 3438452 | 3/1986 | Germany . |
| 3811103 | 10/1989 | Germany . |

OTHER PUBLICATIONS

IEEE Publ. vol. AC–25, No. 3, Jun. 1980, pp. 399–412, "Feedback System Design: The Fractional Represent.etc".
Archiv of Electronic Eng. Publ. 76 Nov. 1992, pp. 49–58, "A robust, integrated digital controller for a gas . . . ".
IEEE Transactions On Energy Conversion, vol. 4, No. 1, Mar. 1989, New York, U.S., pp. 54–61 (Gu et al.).

*Primary Examiner*—John T. Kwon
*Attorney, Agent, or Firm*—Herbert L. Lerner; Laurence A. Greenberg

[57] ABSTRACT

In a method and a device for the closed-loop control of a turbine-generator configuration, a turbine control element is supplied with a first correcting variable and an exciter control element is supplied with a second correcting variable. The correcting variables in each case are formed from at least one reference value. In order to ensure reliable closed-loop control, the first correcting variable for the turbine control element is composed of at least two partial correcting variables. One of the partial correcting variables is derived from the reference value for forming the second correcting variable for the exciter control element.

9 Claims, 1 Drawing Sheet

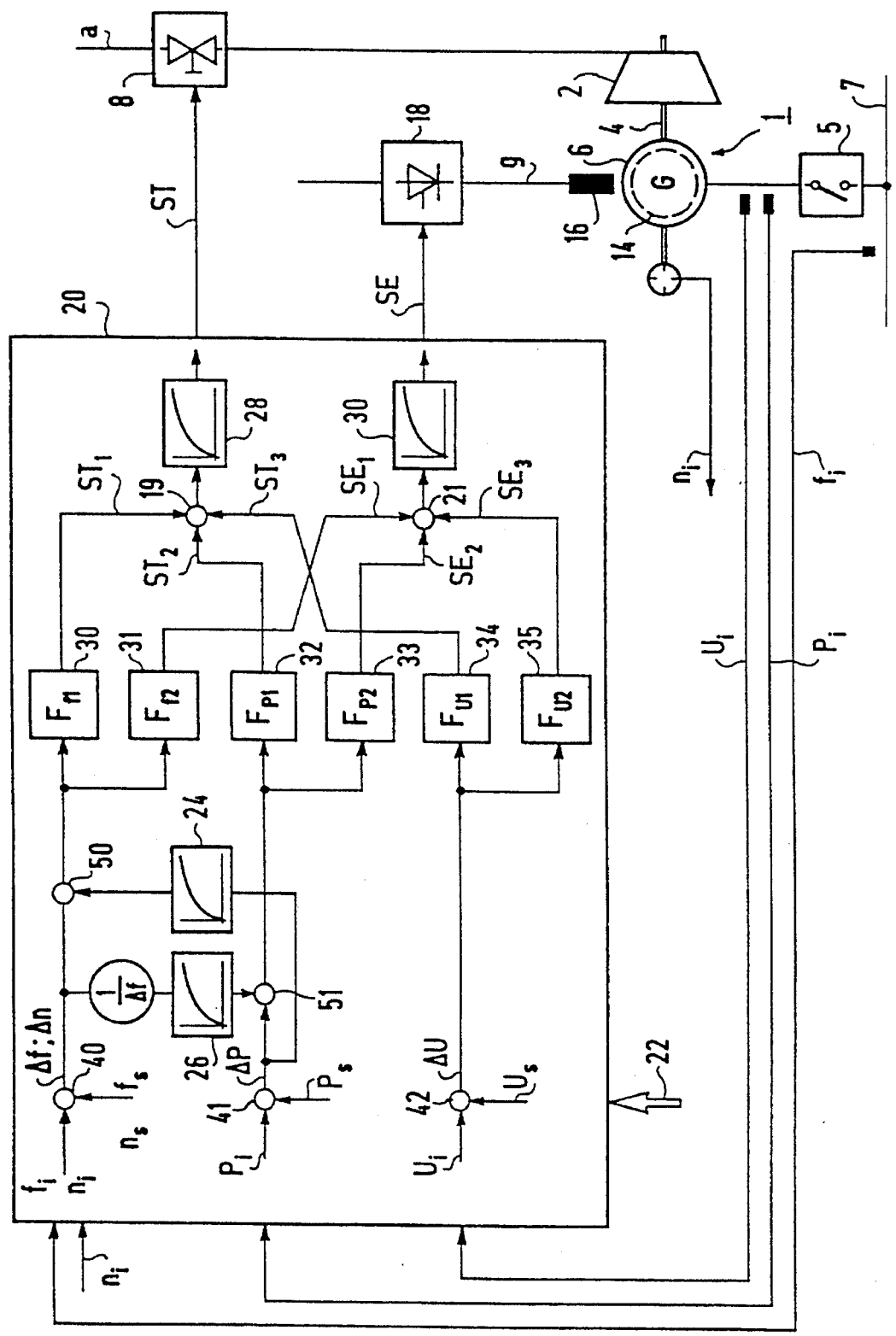

METHOD AND CLOSED-LOOP CONTROL DEVICE FOR THE CLOSED-LOOP CONTROL OF A TURBINE-GENERATOR CONFIGURATION

BACKGROUND OF THE INVENTION

This is a continuation of PCT/DE93/00391, filed May 5, 1993.

FIELD OF THE INVENTION

The invention relates to a method for the closed-loop control of a turbine-generator configuration, in which a turbine control element is supplied with a first correcting variable, an exciter control element is supplied with a second correcting variable, and in each case the correcting variables are formed from at least one reference value. The invention also relates to a closed-loop control device operating in accordance with the method.

On the basis of a simple mechanical speed governor for a turbine and an electromechanical voltage regulator for a generator, the controlling systems or the closed-loop control devices in power stations, for example in gas turbine and steam turbine plants, were continuously improved over the course of time and adapted to match the development in technology.

In a known closed-loop control method, the quantity of the working medium flowing into the turbine is controlled through a turbine control element, the correcting variable of which is formed in a closed-loop control circuit from the deviation of the actual power of the generator from a setpoint power. In a further closed-loop control circuit, a further correcting variable which is supplied to an exciter control element controlling the exciter current of the generator is formed from the deviation of the actual voltage of the generator from a setpoint voltage.

The closed-loop control circuits influence one another through the controlled system assembled from a turbine, a generator and a power system fed by the generator. That can lead to the closed-loop control circuits operating against one another in compensating processes, while impairing the overall closed-loop control behavior. In order to compensate for that influence, a correction variable derived from the generator power is supplied as a partial-correcting variable to the exciter control element in the known method.

That compensates for power system fluctuations or changes in the slip frequency and damps power swings. Such power swings occur especially in power station plants which are coupled to an interconnected power system over long lines. A circuit configuration for damping power swings in power systems is described, for example, in German Patent DE 28 51 871 C2.

It is true that when a steam turbine is used, the simplifying assumption of dynamic decoupling of the closed-loop control circuits is still adequate for describing the overall system. However, when a gas turbine is used, unwanted coupling which could lead to an undamping of the separate closed-loop control systems occurs due to the fact that the delays or response times of the gas turbine are comparatively short as compared with the steam turbine. Such coupling problems also occur in plants having a number of turbine-generator units, especially in gas and steam turbine plants. It is true that by using the above-mentioned circuit configuration for damping power swings which is implemented in a so-called swing-damping device, the closed-loop control circuit of the turbine achieves a certain influence on the closed-loop control circuit of the generator. Nevertheless, the two closed-loop control circuits operate separately from one another.

SUMMARY OF THE INVENTION

It is accordingly an object of the invention to provide a method and a closed-loop control device for the closed-loop control of a turbine-generator configuration, which overcome the hereinafore-mentioned disadvantages of the heretoforeknown methods and devices of this general type and which do so in such a manner that reliable closed-loop control of the turbine-generator configuration is possible.

With the foregoing and other objects in view there is provided, in accordance with the invention, a method for the closed-loop control of a turbine-generator configuration, which comprises supplying a turbine control element with a first correcting variable; supplying an exciter control element with a second correcting variable; forming each of the correcting variables from at least one respective reference value; forming the first correcting variable for the turbine control element from at least two partial correcting variables; and deriving one of the at least two partial correcting variables from the reference value for forming the second correcting variable for the exciter control element.

In accordance with another mode of the invention, the correcting variable for the exciter control element is also composed of at least two partial correcting variables, with one partial correcting variable being derived from the reference value for forming the correcting variable for the turbine control element.

In order to improve the closed-loop control with respect to the dynamic response of the overall system, the rotational speed of the turbine and/or the generator frequency in the case where the turbine-generator configuration is coupled to an interconnected power system, are suitably measured.

In accordance with a further mode of the invention, in each case the correcting variables are composed of three partial correcting variables, and in each case one of the three partial correcting variables is derived from a reference value formed from a deviation from the setpoint speed or, respectively, from the power system frequency.

In accordance with an added mode of the invention, in order to avoid undefined states from arising from the mismatch of three controlled variables and two correcting variables, the reference values formed from a frequency deviation and from a deviation of the output generator power from the demanded generator power are cross coupled. The coupling is suitably effected through delay elements.

With the objects of the invention in view, there is also provided a closed-loop control device for controlling a turbine-generator configuration, comprising a turbine control element; an exciter control element; and a controller receiving actual values of a generator power and of a generator voltage as input variables; the controller forming each of first and second correcting variables from at least one respective reference value; the controller outputting the first correcting variable to the turbine control element and the second correcting variable to the exciter control element; the controller having means for combining at least two partial correcting variables together to form the first correcting variable for the turbine control element; and the controller having means for deriving one of the partial correcting variables from the reference value for forming the second correcting variable for the exciter control element.

In accordance with a concomitant feature of the invention, there are provided further means for combining two further partial correcting variables which in turn together form the second correcting variable for the exciter control element, one of these partial correcting variables being derived from the reference value for forming the correcting variable for the turbine control element.

The functions which are required for providing the correcting variables for the turbine control element and the exciter control element, are suitably combined in a single controller in the form of an algorithm. The functions describe the respective influence of the power, the generator voltage and the generator frequency or turbine speed on the correcting variables.

The advantages achieved by means of the invention are particularly that a communication can take place between the interacting closed-loop control circuits due to an alternate transmission of the reference values of the closed-loop control circuits of the turbine and of the generator through partial correcting variables. The functions required for this can be implemented as an algorithm in a single controller. Such a controller is known as a two-variable or multiple-variable controller.

Other features which are considered as characteristic for the invention are set forth in the appended claims.

Although the invention is illustrated and described herein as embodied in a method and a closed-loop control device for the closed-loop control of a turbine-generator configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The figure of the drawing is schematic and block circuit diagram of an embodiment of a closed-loop control circuit for a turbine-generator configuration according to the invention.

DESCRIPTION OF THE PREFERRED EMBODIMENT

Referring now to the single figure of the drawing in detail, there is seen a turbine-generator configuration 1 which includes a turbine 2 that drives a generator 6 through a shaft 4. When a unit switch 5 is closed, the generator 6 feeds into a supply system or mains 7. The turbine 2 can be a gas turbine or a steam turbine.

In order to adjust a current of a working medium flowing into the turbine 2, a control element 8 in the form of a valve or a number of valves is provided.

A rotating exciter part 14 of the generator 6 is excited by a field winding 16 disposed in a stator. A non-illustrated auxiliary exciter feeds the field winding 16 through an exciter control element 18 in the form of a thyristor set. The exciter control element 18 forms a variable direct current or exciter current g required for the excitation.

A closed-loop control device or a turbo-set controller or multiple-variable controller 20 is supplied with actual values of a generator power $P_i$, a generator voltage $U_i$ and a turbine speed $n_i$ or a generator frequency $f_i$ as input variables. Setpoint values of a generator power $P_s$ a generator voltage $U_s$ and a turbine speed $n_s$ are also variables which are input into the multiple-variable controller 20. Further input variables that are indicated by an arrow 22 are reference variables, for example a power system frequency $f_s$, limiting correcting variables and commands from a power station control room. Correcting variables ST and SE that are output by the multiple-variable controller 20 are respectively applied to the turbine control element 8 and to the exciter control element 18.

The correcting variables ST and SE are respectively composed of partial correcting variables $ST_1$ to $ST_3$ and $SE_1$ to $SE_3$, which are derived in each case from a reference value $\Delta f$ or $\Delta n$, $\Delta p$, $\Delta U$ with the aid of structural elements 30 to 35 for forming respective transfer functions $F_{f1}$, $F_{P1}$ and $F_{U1}$ and $F_{f2}$, $F_{P2}$ and $F_{U2}$. Such transfer functions F are described, for example, in an article in the publication IEEE Transactions on Automatic Control, Vol. AC-25, No. 3, 1980, by C. Desoer, R. W. Liu, J. Murray and R. Saeks, entitled: "Feedback System Design: The Fractional Representation Approach to Analysis and Synthesis"; and in a publication by K. Müller, entitled: "Ein Entwurfsverfahren für selbsteinstellende robuste Regelungen" [A Design Method for Self-Adjusting Rugged Controls], a thesis for the Brunswick Technical University 1989. Details thereon are also found in the publication entitled: "Archiv für Elektronik" [Archive for Electrical Technology], 76 (1992) 49–58, published by Springer Verlag. The reference values $\Delta f$ or $\Delta n$, $\Delta P$, $\Delta U$ are obtained by forming a difference between the actual values $f_i$ or $n_i$, $P_i$ and $U_i$, respectively, and the setpoint or command values $f_s$ or $n_s$, $P_s$ and $U_s$, respectively, at respective reference points 40, 41, 42. The values are preferably initially converted into digital values with the aid of non-illustrated analog/digital converters.

When the unit switch 5 is closed, the reference values $\Delta f$ and $\Delta P$ are coupled to one another alternately or in a duplicated manner. For this purpose, on one hand, the reference value $\Delta P$ which is formed from a deviation of the actual power $P_i$ from the setpoint or command power $P_s$ of the generator 6 is added to the reference value $\Delta f$ at an addition point 50 through a delay element 24. On the other hand, the reference value $\Delta f$ which is formed from a deviation of the generator frequency $f_i$ from the power system frequency $f_s$ is added as an inverse value $1/\Delta f$ to the reference value $\Delta P$ at an addition point 51 through a delay element 26.

Due to the unavoidable complexity of the multiple-variable controller 20, particularly the six transfer functions F, computer-supported algorithms (computer program) are used for the closed-loop control. The closed-loop control algorithm also takes into consideration the case in which a controlled variable reaches a limiting value or the case in which, for example, during a start-up process of a power station plant, only the turbine closed-loop control circuit controlling the turbine control element 8 is switched on. Switching over to a combined closed-loop control which starts when the exciter part 14 is fed through the field winding 16 and thus when the generator voltage U is building up, is possible at any time. During this process, a communication takes place between the turbine closed-loop control circuit and the generator closed-loop control circuit by means of the six transfer functions F. The exciter control element 18 then adjusts the variable exciter current g.

Within the multiple-variable controller 20, the correcting variable ST for the turbine control element 8 is composed from the partial correcting variables $ST_1$ to $ST_3$ by means of a combining element 19. In this process, the influence of $U_i$ from the setpoint or command value $U_s$ on the correcting the deviation $\Delta U$ of the actual value of the generator voltage variable ST is implemented by means of the transfer function $F_{U1}$. The influence of the deviation $\Delta f$ of the generator frequency $f_i$ from the power system frequency $f_s$ on the correcting variable ST is implemented by means of the transfer function $F_{f1}$.

Correspondingly, the correcting variable SE for the exciter control element 18 is composed from the partial correcting variables $SE_1$ to $SE_3$ by means of a further combining element 21. In this process, the influence of the deviation $\Delta P$ of the actual value $P_i$ of the generator power P from the setpoint or command value $P_r$ and of the frequency deviation $\Delta f$ on the correcting variable SE is implemented by means of the transfer functions $F_{P2}$ and $F_{f2}$, respectively. The correcting variables ST and SE, that are composed from the partial correcting variables, are applied to the control elements 8, 18 through respective delay elements 28 and 30'.

Taking the frequency change $\Delta f$ into consideration when forming the correcting variables ST, SE makes it possible to improve the closed-loop control with respect to the dynamic response of the controlled system composed of the turbine 2, the generator 6 and the power supply system or mains 7. In addition, the alternate or duplicate coupling of the reference values $\Delta P$ and $\Delta f$ through the respective delay elements 24 and 26 ensures that no undefined states arise from the mismatch of three controlled variables f, P, U and two correcting variables ST, SE. The delay elements 24, 26 in the coupling only influence the steady-state condition. They do not need to be taken into consideration in the conceptional control plan.

During operation, wear or contamination of components and displacements of operating points and system switchovers can lead to unpredictable changes in the controlled system which can only be estimated in the order of magnitude. The closed-loop control algorithm of the multiple-variable controller 20 should therefore be insensitive or resistant to such changes in the controlled system. Since the behavior of the controlled system can change very greatly during a switch-over from one operating means for the turbine 2 to another and during the transition from interconnected power system operation to isolated power system operation, an adaptation strategy is built into the multiple-variable controller 20. In this configuration, the adjustment of the multiple-variable controller 20 is corrected from known experience obtained during operation and from simulations, which is taken into consideration in the form of model computations, for example in the transfer functions F. The multiple-variable controller 20 is thus corrected both on the basis of measurable variables and on the basis of variables of the process determined by mathematical means.

The control accuracy of the multiple-variable controller 20 is automatically assessed during operation. The assessment is built up in several stages. In a first stage, non-measurable variables, for example the power system reactance, are calculated from measurable variables and characteristic values are analytically determined. In a second stage, these calculated values are compared with empirical values which are contained in suitable form in the multiple-variable controller 20. The assessment is carried out on the basis of the fuzzy logic principle based on comparison operations with fuzzy areas.

We claim:

1. A method for the closed-loop control of a turbine-generator configuration, which comprises:

supplying a turbine control element with a first correcting variable;

supplying an exciter control element with a second correcting variable;

forming each of the correcting variables from at least one respective reference value;

forming the first correcting variable for the turbine control element from at least two partial correcting variables; and deriving one of the at least two partial correcting variables from the reference value for forming the second correcting variable for the exciter control element.

2. The method according to claim 1, which comprises forming the correcting variable for the exciter control element from at least two partial correcting variables, and deriving one of the at least two partial correcting variables from the reference value for forming the first correcting variable for the turbine control element.

3. The method according to claim 1, which comprises forming each of the first and second correcting variables from three respective partial correcting variables, and deriving one of the partial correcting variables for forming the first correcting variable and one of the partial correcting variables for forming the second correcting variable from a reference value formed from a deviation of an actual speed from a setpoint speed of a turbine.

4. The method according to claim 1, which comprises forming each the first and second correcting variables from three respective partial correcting variables, and deriving one of the partial correcting variables for forming the first correcting variable and one of the partial correcting variables for forming the second correcting variable from a reference value formed from a deviation of a generator frequency from a frequency of an interconnected power system coupled to the turbine-generator configuration.

5. The method according to claim 4, which comprises forming a reference value from a deviation of an actual power from a setpoint power of a generator, and cross coupling the reference value formed from the deviation of the generator frequency from the power system frequency and the reference value formed from the deviation of the actual power from the setpoint power of the generator.

6. The method according to claim 1, which comprises selecting the reference value for forming the first correcting variable as a deviation of a generator power.

7. The method according to claim 1, which comprises selecting the reference value for forming the second correcting variable as a deviation of a generator voltage.

8. A closed-loop control device for controlling a turbine-generator configuration, comprising:

a turbine control element;

an exciter control element; and a controller receiving actual values of a generator power and of a generator voltage as input variables;

said controller forming each of first and second correcting variables from at least one respective reference value;

said controller outputting the first correcting variable to said turbine control element and the second correcting variable to said exciter control element;

said controller having means for combining at least two partial correcting variables together to form the first correcting variable for said turbine control element; and said controller having means for deriving one of the partial correcting variables from the reference value for forming the second correcting variable for said exciter control element.

9. The closed-loop control device according to claim 8, including further means for combining at least two partial correcting variables together to form the second correcting variable for said exciter control element, and means for deriving one of the partial correcting variables from the reference value for forming the correcting variable for said turbine control element.

* * * * *